(12) United States Patent
Narita et al.

(10) Patent No.: US 10,875,544 B2
(45) Date of Patent: Dec. 29, 2020

(54) INFORMATION TRANSFER DEVICE, ELECTRONIC CONTROL DEVICE, INFORMATION TRANSMISSION DEVICE, AND ELECTRONIC CONTROL SYSTEM

(71) Applicant: DENSO CORPORATION, Kariya (JP)

(72) Inventors: Takahiro Narita, Kariya (JP); Masuhiro Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 201 days.

(21) Appl. No.: 15/751,244

(22) PCT Filed: Aug. 10, 2016

(86) PCT No.: PCT/JP2016/073529
§ 371 (c)(1),
(2) Date: Feb. 8, 2018

(87) PCT Pub. No.: WO2017/026504
PCT Pub. Date: Feb. 16, 2017

(65) Prior Publication Data
US 2018/0229741 A1    Aug. 16, 2018

(30) Foreign Application Priority Data
Aug. 10, 2015  (JP) .................................. 2015-158149

(51) Int. Cl.
*B60W 30/14*  (2006.01)
*B60W 30/16*  (2020.01)
(Continued)

(52) U.S. Cl.
CPC ........ *B60W 50/085* (2013.01); *B60W 30/143* (2013.01); *B60W 30/16* (2013.01);
(Continued)

(58) Field of Classification Search
CPC .. B60W 50/085; B60W 40/04; B60W 30/143; B60W 30/16; B60W 50/14;
(Continued)

(56) References Cited

U.S. PATENT DOCUMENTS 10,049,505 B1 *   8/2018   Harvey ................. G06Q 40/08
2017/0113686 A1 *   4/2017   Horita ................... B60W 30/09
(Continued)

FOREIGN PATENT DOCUMENTS

JP    2008-120271 A    5/2008
JP    2008-180591 A    8/2008
(Continued)

*Primary Examiner* — Behrang Badii
*Assistant Examiner* — Hossam M Abd El Latif
(74) *Attorney, Agent, or Firm* — Maschoff Brennan (57) ABSTRACT

In an information transfer device (5) installed in a vehicle (3), the vehicle carrying the information transfer device (5) is referred to as a subject vehicle, and an information acquisition unit (9) acquires through communications with another vehicle (a) information indicating whether the other vehicle is being automatically driven, (b) information indicating functions of the other vehicle related to automatic driving, and (c) information indicating a schedule of the other vehicle related to automatic driving. An information processing unit (11) provides the information acquired by the information acquisition unit to the driver of the subject vehicle (3) or outputs the same to a driving control device (7) of the subject vehicle (3).

8 Claims, 3 Drawing Sheets

(51) Int. Cl.
*B60W 40/04* (2006.01)
*B60W 50/00* (2006.01)
*B60W 50/08* (2020.01)
*B60W 50/14* (2020.01)
*G05D 1/00* (2006.01)
*G08G 1/0967* (2006.01)
*G08G 1/16* (2006.01)

(52) U.S. Cl.
CPC ............ *B60W 40/04* (2013.01); *B60W 50/14* (2013.01); *G05D 1/0027* (2013.01); *G05D 1/0061* (2013.01); *G08G 1/09675* (2013.01); *G08G 1/096716* (2013.01); *G08G 1/096725* (2013.01); *G08G 1/096741* (2013.01); *G08G 1/096791* (2013.01); *B60W 2050/0077* (2013.01); *B60W 2050/0096* (2013.01); *B60W 2552/00* (2020.02); *B60W 2556/65* (2020.02); *B60W 2710/20* (2013.01); *B60W 2720/10* (2013.01); *B60W 2720/106* (2013.01); *B60W 2754/30* (2020.02); *G05D 2201/0213* (2013.01); *G08G 1/163* (2013.01); *G08G 1/166* (2013.01)

(58) Field of Classification Search
CPC ....... B60W 2720/10; B60W 2750/308; B60W 2050/0077; B60W 2050/0096; B60W 2550/14; B60W 2550/408; B60W 2710/20; B60W 2720/106; G05D 1/0061; G05D 2201/0213; G08G 1/096716; G08G 1/096725; G08G 1/096791; G08G 1/096741; G08G 1/09675; G08G 1/163; G08G 1/166
USPC .......................................................... 701/23
See application file for complete search history.

(56) References Cited

U.S. PATENT DOCUMENTS

2017/0236415 A1* 8/2017 Okabe ................. G08G 1/0129 701/117
2018/0039932 A1* 2/2018 Moreira-Matias ..... G06Q 10/08

FOREIGN PATENT DOCUMENTS

| JP | 2008180591 A | * | 8/2008 |
| JP | 2009-003528 | | 1/2009 |
| JP | 2009-003538 | | 1/2009 |
| JP | 2015-044432 A | | 3/2015 |
| JP | 2015044432 A | * | 3/2015 |
| JP | 2015-106326 A | | 6/2015 |
| JP | 2015-141641 A | | 8/2015 |

* cited by examiner

INFORMATION TRANSFER DEVICE, ELECTRONIC CONTROL DEVICE, INFORMATION TRANSMISSION DEVICE, AND ELECTRONIC CONTROL SYSTEM

CROSS-REFERENCE TO RELATED APPLICATION

This patent application is based on Japanese Patent Application No. 2015-158149, filed on Aug. 10, 2015, in the Japan Patent Office, the entire disclosure of which is hereby incorporated by reference herein.

TECHNICAL FIELD

The present invention relates to an information transfer device, an electronic control device, an information transmission device, and an electronic control system.

BACKGROUND ART

There is known a vehicle capable of automatic driving without a driver's driving operations in accordance with a preset running plan (refer to Patent Literature 1). The vehicle described in Patent Literature 1 can switch between running under automatic driving control and running by a driver's manual driving.

CITATION LIST

Patent Literature

[PTL 1] JP 2008-120271 A

SUMMARY OF THE INVENTION

Solution to Problem

It is conceived in some situations that there is a mixture of vehicles under automatic driving control (hereinafter, referred to as automatically driven vehicles) and vehicles running by manual driving (hereinafter, referred to as manually driven vehicles) on the same road. In such situations, it is difficult to determine whether vehicles running around the subject vehicle are being automatically driven vehicles or manually driven vehicles.

If a vehicle driving near the subject vehicle is an automatically driven vehicle, the vehicle may move differently from manually driven vehicles. At that time, the driver of the subject vehicle may feel a sense of unease without knowing the reason for the movement of the other vehicle. In addition, it is difficult for a driving control device of the subject vehicle to perform appropriate controls depending on the status of other vehicles (whether the other vehicles are being automatically driven vehicles or manually driven vehicles).

The present invention is devised in light of the foregoing circumstances. An object of the present invention is to provide a technique for helping alleviate a sense of unease the driver of the subject vehicle might feel and enabling appropriate controls on the subject vehicle.

Solution to Problem

An information transfer device in one aspect of the present invention includes, when a vehicle with the information transfer device is designated as a subject vehicle, an information acquisition unit that acquires through communications with another vehicle (a) information indicating whether the other vehicle is being automatically driven, (b) information indicating functions of the other vehicle related to automatic driving, and (c) information indicating a schedule of the other vehicle related to automatic driving, and an information processing unit that provides the information acquired by the information acquisition unit to the driver of the subject vehicle or outputs the same to a driving control device of the subject vehicle.

The information transfer device can acquire the information (a) to (c) and provide the same to the driver of the subject vehicle, for example. This allows the driver of the subject vehicle to know the reason for the movement of the other vehicle (for example, acceleration, deceleration, or steering) and learn in advance the future movements of the other vehicle. As a result, the information transfer device can help alleviate a sense of unease the driver of the subject vehicle might feel.

The information transfer device can also acquire the information (a) to (c) and output the same to the driving control device of the subject vehicle, for example. The driving control device of the subject vehicle can perform appropriate controls depending on the status of the other vehicle, based on the information (a) to (c).

An electronic control device in one aspect of the present invention includes the information transfer device and the driving control device described above. The driving control device changes a control mode of the subject vehicle based on the information acquired from the information transfer device. According to the electronic control device, it is possible to perform appropriate controls depending on the status of the other vehicle.

An information transmission device in one aspect of the present invention includes a transmission unit that, when a vehicle with the information transmission device is designated as a subject vehicle, transmits (A) information indicating whether the subject vehicle is being automatically driven, (B) information indicating functions of the subject vehicle related to automatic driving, and (C) information indicating a schedule of the subject vehicle related to automatic driving.

The information transmission device can transmit the information (A) to (C). The information transfer device and the electronic control device described above can acquire and use the information transmitted by the information transmission device. The information (A) to (C) is equivalent to the information (a) to (c) for the information transfer device and the electronic control device having acquired the information.

An electronic control system in one aspect of the present invention includes the electronic control device and the information transmission device described above. These devices are installed in different vehicles. The information transmission device can transmit the information (A) to (C). The electronic control device can acquire and use that information.

Accordingly, it is possible to help alleviate a sense of unease the driver of the vehicle with the electronic control device might feel about the Vehicle with the information transmission device, for example. In addition, the driving control device of the vehicle with the electronic control device can perform appropriate controls depending on the status of the vehicle with the information transmission device, for example.

DESCRIPTION OF EMBODIMENTS

Embodiments of the present invention will be described below in detail with reference to the accompanying drawings. However, the present invention can be carried out in many different embodiments and should not be interpreted to be limited to the embodiments described herein. Instead, these embodiments are provided to make the disclosure of the present invention exhaustive and complete and inform fully the scope of the present invention to persons skilled in the art. Similar reference signs represent similar components in all the drawings.

First Embodiment

1. Configuration of Electronic Control Device 1

Figure 1:
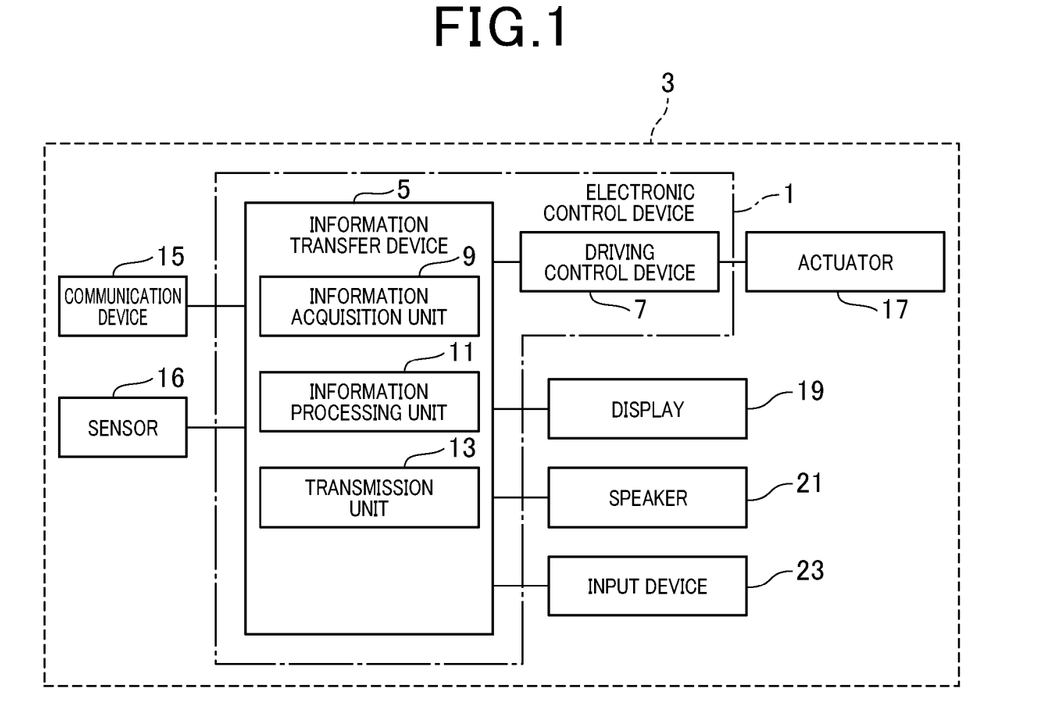
FIG. 1 is a block diagram illustrating a configuration of an electronic control device according to an embodiment of the present invention.

A configuration of the electronic control device 1 will be described with reference to FIG. 1. The electronic control device 1 is an in-vehicle device installed in a vehicle. The electronic control device 1 is installed in each of a plurality of vehicles. In the following description, an arbitrary one of the plurality of vehicles with the electronic control device 1 is designated as subject vehicle 3, and the other vehicles are designated as other vehicles. A configuration of the electronic control device 1 installed in the subject vehicle 3 is described here but the electronic control devices 1 installed in the other vehicles are configured in a similar manner.

The electronic control device 1 includes an information transfer device 5 and a driving control device 7. Each of the information transfer device 5 and the driving control device 7 is a publicly known computer with a central processing unit (CPU), a random-access memory (RAM), a read-only memory (ROM), an input/output interface, and the like. The CPU executes various programs stored in the ROM to perform processes described later.

The information transfer device 5 includes an information acquisition unit 9, an information processing unit 11, and a transmission unit 13 as functional blocks. The functions of the individual units will be described later.

The driving control device 7 can perform controls corresponding to automatic driving. The control processes corresponding to automatic driving are as follows:

(i) Control to run on a route preset in map data.

(ii) Control to detect an obstacle by using a sensor 16 described later, and perform deceleration, steering, or the like to avoid a collision with the obstacle.

(iii) Control to detect a preceding vehicle by using the sensor 16 and follow the preceding vehicle with the distance between the preceding vehicle and the subject vehicle 3 kept at a target inter-vehicle distance.

(iv) Control to run at a target speed without a preceding vehicle.

(v) Control to detect a preceding vehicle by using the sensor 16 and make a lane change to pass the preceding vehicle when the speed of the preceding vehicle is equal to or less than a threshold.

(vi) Control to acquire the relative position of the subject vehicle 3 in the lane by using the sensor 16, and perform steering, deceleration, or the like such that the subject vehicle 3 does not deviate from the lane.

(vii) Control to acquire road information and create a speed plan in automatic driving (speed schedule of the subject vehicle 3 for the future) in accordance with the road information. A specific example of this control is to acquire through road-to-vehicle communications signaling schedules of traffic lights on the route (for example, information on what seconds after which of the traffic lights will turn red and what seconds after the traffic lights will change to green), and create a speed plan of the subject vehicle 3 in such a manner as to minimize the number of times or the duration of time the subject vehicle 3 will stop on a red light.

The driving control device 7 can perform known controls corresponding to manual driving. Even at the time of manual driving, the driving control device 7 can also performs the controls (ii) to (vi) in accordance with the driver's operation input.

In addition to the electronic control device 1, the subject vehicle 3 includes a communication device 15, a sensor 16, an actuator 17, a display 19, a speaker 21, and an input device 23. The communication device 15 can transmit and receive information through vehicle-to-vehicle communications or road-to-vehicle communications. A possible partner in vehicle-to-vehicle communications is the electronic control device 1 installed in another vehicle.

The sensor 16 detects targets (other vehicles, obstacles, and the like) existing around the subject vehicle 3. The sensor 16 is an image sensor, a millimeter-wave radar, a lidar, or the like, for example.

The actuator 17 performs operations on the engine, brake, steering, and the like of the subject vehicle 3 in accordance with instructions from the driving control device 7. The actuator 17 also makes a response to the driving control device 7 to inform whether the operation has been performed in accordance with the instruction from the driving control device 7 and what the result of the operation is (for example, the instruction from the driving control device 7 is to set the vehicle speed to 50 Km/h, and the vehicle speed has become 51 Km/h as a result of the operation).

The display 19 is provided in the interior of the subject vehicle 3 to display various images in accordance with instructions from the information transfer device 5. The speaker 21 is provided in the interior of the subject vehicle 3 to output various sounds in accordance with instructions from the information transfer device 5.

The input device 23 is provided in the interior of the subject vehicle 3 to accept input operations by a passenger (for example, the driver). The input operations include switching on and off automatic driving, approval or rejection of suggestions from the information transfer device 5, and the like.

As the subject vehicle 3 does, other vehicle include the communication device 15, the sensor 16, the actuator 17, the display 19, the speaker 21, and the input device 23. The information transfer device 5 is an example of an information transfer device and an information transmission device. The electronic control device 1 installed in the subject vehicle 3 and the information transfer devices 5 (an example of an information transmission device) installed in the other vehicles constitute an electronic control system.

2. Information Transfer Process Executed by Information Transfer Device 5

Figure 2:
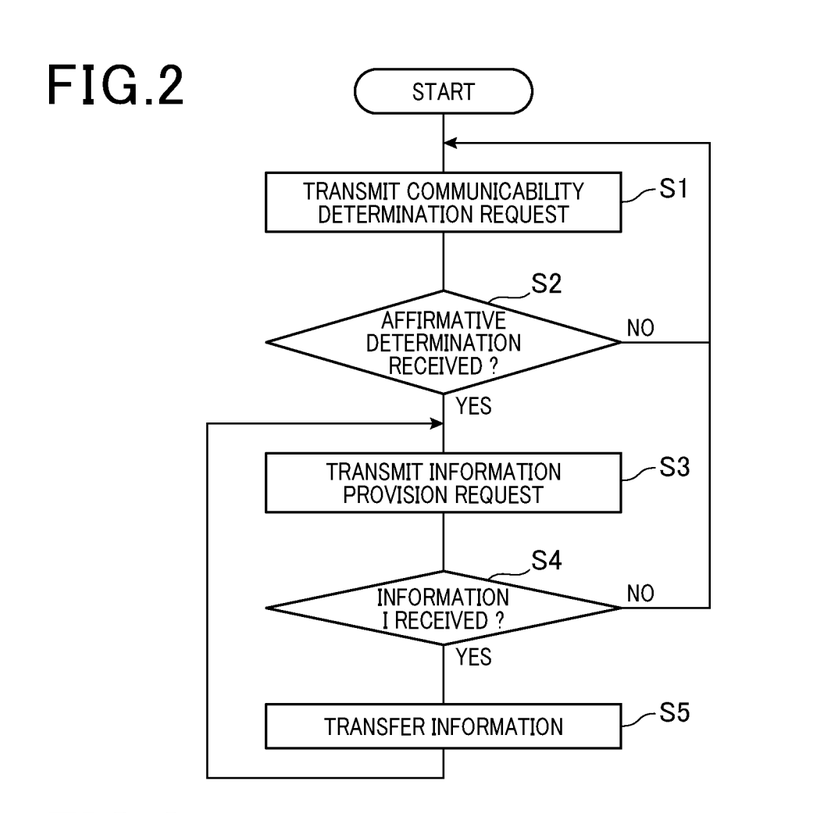
FIG. 2 is a flowchart of an information transfer process executed by an information transfer device illustrated in FIG. 1.

An information transfer process executed by the information transfer device 5 of the subject vehicle 3 will be described with reference to FIG. 2.

In step S1, the information acquisition unit 9 uses the communication device 15 to transmit a communicability determination request.

In step S2, the information acquisition unit 9 determines whether the communication device 15 has received a communicability determination. The communicability determination is transmitted by the information transfer device 5 installed in the other vehicle in step S22 described later, in response to the communicability determination request transmitted in step S1. When the communication device 15 has received the communicability determination, the process proceeds to step S3. When the communication device 15 has not received the communicability determination, the process returns to step S1.

In step S3, the information acquisition unit 9 uses the communication device 15 to transmit an information provision request.

In step S4, the information acquisition unit 9 determines whether information I has been received. The information I refers to information transmitted by the information transfer device 5 installed in the other vehicle in step S24 described later, in response to the information provision request transmitted in step S3. The information I contains the following items:

(a) Information indicating whether the other vehicle (the source of the information I) is being automatically driven.

(b) Information indicating the functions of the other vehicle related to automatic driving.

(c) Information indicating the schedule of the other vehicle related to automatic driving.

(d) The kind and specification of the sensor 16 used by the other vehicle for automatic driving (for example, the sensor 16 can detect the locations and speeds of vehicles within a range of radius X m or the like, where X represents a positive number).

(e) Information indicating the locations, speeds, and the like of vehicles existing around the other vehicle, which is acquired by the sensor 16 installed in the other vehicle).

(f) Information indicating road information (for example, the signaling schedules of traffic lights, the opening/closing schedules of railway crossings, the speed limits of roads, automobile-dedicated roads or not), acquired by the sensor 16 installed in the other vehicle.

(g) Information indicating the destination of the other vehicle by latitude and longitude.

(h) Information indicating the route to the destination (including a choice between branches at a fork in a road).

(i) Information indicating straight sections, the distances of the straight sections, gradients, the distances of the gradients, the radiuses of curves, the distances of the curves, cants (banks), the distances of the cants, and the like on the route to the destination.

(j) Information indicating the reason for the schedule in the (c). For example, information indicating that the other vehicle is scheduled for running at a speed lower than normal in the (3) to perform the control (vii). As another example, information indicating that the other vehicle is scheduled for a deceleration in the (c) to avoid a contact with a vehicle edging its way into traffic to exit an interchange (IC).

(k) Location information on the other vehicle as source of the information I.

The functions indicated by the information (b) include the functions of performing the controls (i) to (vii). The schedule (c) includes a schedule for switching on and off automatic driving, a schedule for changing the control mode in automatic driving, a schedule for steering in automatic driving (right and left turns and lane changes), a schedule for acceleration, deceleration, stop in automatic driving, speed plan, and the like.

When the information I has been received, the process proceeds to step S5. When the information I has not been received, the process returns to step S1.

In step S5, the information processing unit 11 outputs the information I determined as having been received in step S4 to the driving control device 7. The information processing unit 11 makes a notification based on the information I by using the display 19 and the speaker 21. Specifically, the information processing unit 11 displays characters, images, and the like corresponding to the contents of the information I on the display 19, and outputs sounds corresponding to the contents of the information I from the speaker 21. The driver of the subject vehicle 3 can view the indication on the display 19 and hear the sounds from the speaker 21 to learn the contents of the information I.

3. Driving Control Process Executed by Driving Control Device 7

Figure 3:
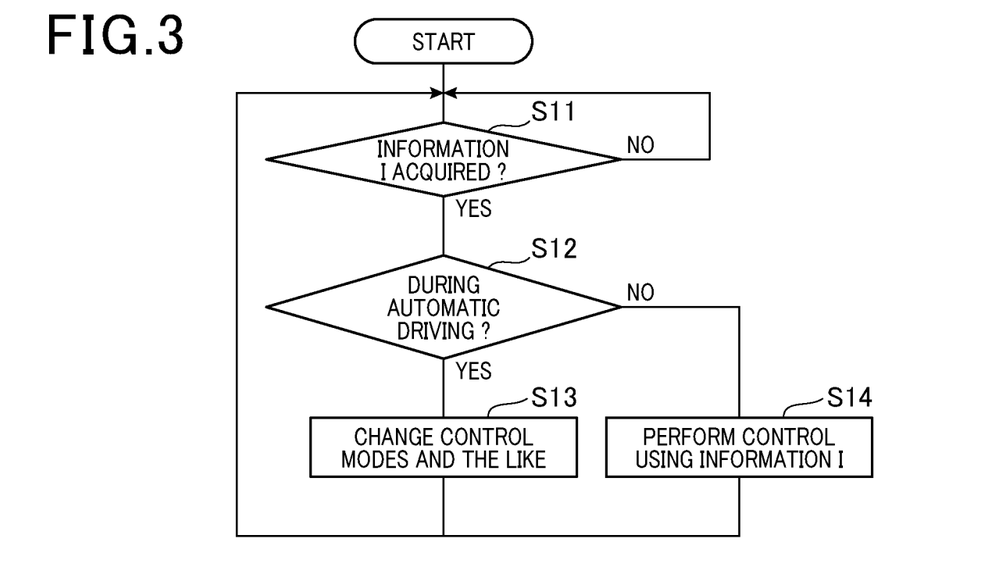
FIG. 3 is a flowchart of a driving control process executed by a driving control device illustrated in FIG. 1.

A driving control process executed by the driving control device 7 of the subject vehicle 3 will be described with reference to FIG. 3. In step S11, it is determined whether the information I has been received. The information I is output by the information transfer device 5 in step S5 as described above. When the information I has been received, the process proceeds to step S12. When the information I has not been received, the process returns to the steps preceding step S11.

In step S12, it is determined whether the subject vehicle 3 is being automatically driven. When the subject vehicle 3 is being automatically driven, the process proceeds to step S13. When the subject vehicle 3 is not being automatically driven (but manually driven), the process proceeds to step S14.

In step S13, the control mode in automatic driving is changed based on the acquired information I. The control mode may be changed based on the information I in such manners as described below.

When the information I transmitted by a preceding vehicle includes the information that the preceding vehicle is being automatically driven and the schedule of the preceding vehicle (for example, speed plan), the target inter-vehicle distance between the preceding vehicle and the subject vehicle 3 in the control (iii) is set to be shorter than normal. This increases the traffic capacity. In addition, since the preceding vehicle is being automatically driven and the driving control device 7 has acquired the schedule of automatic driving, the shortened target inter-vehicle distance would be unlikely to decrease safety.

Whether the preceding vehicle is the source of the information I can be determined by comparing the location information of the other vehicle included in the information I to the location information of the preceding vehicle detected by the subject vehicle 3 using the sensor 16.

When the information I transmitted by the preceding vehicle includes the information that the preceding vehicle is now being automatically driven but will end automatic driving in future, the target inter-vehicle distance in the control (iii) is set to be longer than the current value. This improves the safety of the subject vehicle 3.

When the information I transmitted by the preceding vehicle includes the information that the preceding vehicle is now manually driven but will start automatic driving in future, the target inter-vehicle distance in the control (iii) is set to be shorter than the normal value. This increases the traffic capacity. In addition, since the preceding vehicle will start automatic driving in future, the shortened target inter-vehicle distance would be unlikely to decrease safety.

In step S3, the control described below is performed based on the acquired information I. For example, when the information I transmitted by the preceding vehicle includes a schedule for right or left turn, deceleration, stop, or the like, the subject vehicle 3 changes to a lane different from the one in which the preceding vehicle is running. This allows the subject vehicle 3 to run smoothly, which can shorten the required time before arriving at the destination and reduce fuel consumption.

Even though the subject vehicle 3 is performing the control (v) and the speed of the preceding vehicle is over a threshold (even in a situation where the subject vehicle 3 is not to pass the preceding vehicle under normal conditions), when the information I transmitted by the preceding vehicle includes a schedule for right or left turn, deceleration, stop, or the like, the subject vehicle 3 makes a lane change to pass the preceding vehicle. This allows the subject vehicle 3 to run smoothly, which can shorten the required time before arriving at the destination and reduce fuel consumption.

When the information I transmitted by the preceding vehicle includes a schedule for acceleration, deceleration, stop, or the like, the subject vehicle 3 accelerates or decelerates in advance such that the inter-vehicle distance between the preceding vehicle and the subject vehicle 3 does not become too long or too short. This increases the traffic capacity and improves the safety of the subject vehicle 3.

When another vehicle as source of the information I is being automatically driven, the subject vehicle 3 runs to the speed of the other vehicle. This enhances the fuel consumption performance and safety of the subject vehicle 3.

In particular, when the other vehicle to which the subject vehicle 3 adjusts the speed has the "function of acquiring the signaling schedules of traffic lights on the route through road-to-vehicle communications and creating the speed plan so that the number of times or the duration of time when the other vehicle will stop at a red light or so that the other vehicle can decelerate or stop gently at a red light", the subject vehicle running to the speed of the other vehicle can also suppress the stop and acceleration and deceleration at a red light to further improve the fuel consumption performance.

In step S14, the schedule of the other vehicle included in the acquired information I is used for the controls (ii), (iii), and (vi) in manual driving.

For example, the schedule of the other vehicle included in the information I is used in the control (ii) to perform deceleration, steering, or the like to avoid a collision with the other vehicle as source of the information I. This improves the safety of the subject vehicle 3.

In the control the schedule of the other vehicle included in the information I is used to calculate the target acceleration and deceleration of the subject vehicle 3 and suggest acceleration or deceleration to the driver in accordance with the target acceleration and deceleration. This suggestion is intended to prompt the driver to keep the distance between the other vehicle as source of the information I and the subject vehicle 3 at the target inter-vehicle distance. This increases the traffic capacity and improves the safety of the subject vehicle 3.

In the process (v), the schedule of the other vehicle included in the information I is used to determine whether to make a lane change and suggest to the driver to run in accordance with the determination result. When the driver acts on the suggestion, the subject vehicle 3 can run smoothly to shorten the required time before arriving at the destination and reduce the fuel consumption.

In step S14, in accordance with the contents of the information I, the magnitude of change in acceleration for a specific amount of accelerator operation, the magnitude of the engine braking at the time of coasting, and the like are changed.

4. Information Transmission Process Executed by Information Transfer Device 5 Installed in Another Vehicle An information transmission process executed by the information transfer device 5 (in particular, the transmission unit 13) installed in another vehicle will be described with reference to FIG. 4.

Figure 4:
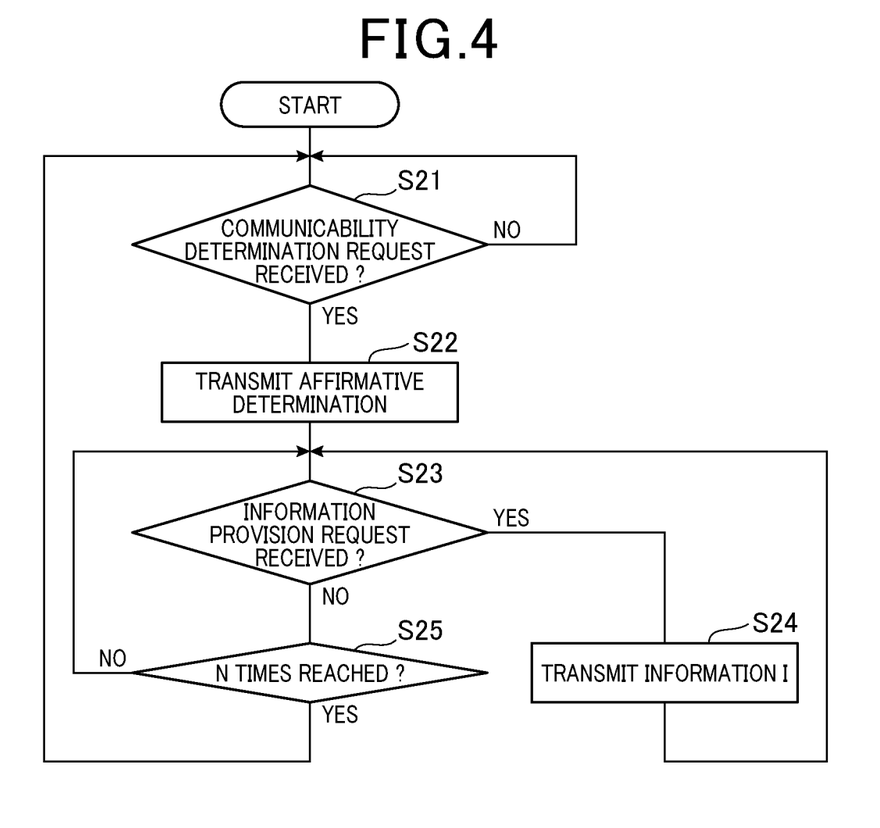
FIG. 4 is a flowchart of an information transmission process executed by an information transfer device installed in another vehicle.

In step S21, it is determined whether the communication device 15 has received a communicability determination request. The communicability determination request is transmitted by the information transfer device 5 installed in the subject vehicle 3 in step S1. When the communication device 15 has received the communicability determination request, the process proceeds to step S22. When the communication device 15 has not received the communicability determination request, the process returns to the steps preceding step S21.

In step S22, a communicability affirmative determination is transmitted. The information transfer device 5 installed in the subject vehicle 3 determines the presence or absence of the communicability affirmative determination in step S2.

In step S23, it is determined whether the communication device 15 has received an information provision request. The information provision request is transmitted by the information transfer device 5 installed in the subject vehicle 3 in step S3. When the communication device 15 has received the information provision request, the process proceeds to step S24. When the communication device 15 has not received the information provision request, the process proceeds to step S25.

In step S24, the information I about the other vehicle is generated by using the information acquired from the driving control device 7, the communication device 15, the sensor 16, and the like installed in the other vehicle, and is transmitted by using the communication device 15. The information transfer device 5 installed in the subject vehicle 3 determines the presence or absence of receipt of the information I in step S4.

Meanwhile, when the negative determination is made in step S23, the process proceeds to step S25 to determine whether the number of times the negative determination was consecutively made in step S23 has reached N (N represents a natural number). When N times have been reached, the process returns to step S21. When N times have not been reached, the process returns to step S23.

5. Advantageous Effects of Information Transfer Device 5 and Electronic Control Device 1

(1A) The information transfer device 5 installed in the subject vehicle 3 acquires the information I from another vehicle and outputs the same to the driving control device 7. The driving control device 7 changes the control mode in automatic driving of the subject vehicle 3 based on the information I. This optimizes the motion of the subject vehicle 3.

(1B) The information transfer device 5 installed in the subject vehicle 3 provides the information I to the driver of the subject vehicle 3. The provision of the information I allows the driver to learn whether the other vehicle as source of the information I is being automatically driven. This can help alleviate the driver's sense of unease.

(1C) The information I includes the foregoing items (b) to (k). When being notified of the contents of the information I during manual driving, the driver of the subject vehicle 3 can perform appropriate driving operations in accordance with the contents of the items (h) to (k). For example, when being notified of the contents of the item (b) that "the other vehicle has the function of running on the route preset in the map data", the driver of the subject vehicle 3 can follow the other vehicle to run on that route.

When being notified of the contents of the item (b) that "the other vehicle has the function of acquiring the signaling schedules of traffic lights on the route through road-to-vehicle communications and creating the speed plan so that the number of times or the duration of time when the other vehicle will stop at a red light or so that the other vehicle can decelerate or stop gently at a red light," the driver of the subject vehicle 3 can presume the reason why the speed of the other vehicle is slow and thus is unlikely to feel a sense of unease. In addition, even though the speed of the other vehicle is slow, the driver of the subject vehicle 3 can follow the other vehicle to reduce the number of times or the duration of time when the subject vehicle 3 will stop at a red light. This improves the fuel consumption of the subject vehicle 3. If the foregoing notification is not made, the driver of the subject vehicle 3 may feel a sense of unease, thinking that the driver of the other vehicle is running at a lower speed than the neighboring traffic stream because the driver of the other vehicle may be drunken or snoozing.

When being notified of the contents of the item (b) that "the other vehicle has the function of detecting in advance a third vehicle entering an intersection where the other vehicle is running through vehicle-to-vehicle communications, and accelerating or decelerating in accordance with the detection result", the driver of the subject vehicle 3 can understand the reason why the other vehicle is accelerating or decelerating differently from the neighboring traffic stream, and is unlikely to feel a sense of unease.

The driver of the subject vehicle 3 can also grasp the future behavior of the other vehicle from the contents of the item (c) and perform driving operations in accordance with that. For example, when the other vehicle preceding the subject vehicle 3 is scheduled to decelerate or stop, the driver of the subject vehicle 3 can decelerate or make a lane change ahead of time. When the other vehicle is scheduled to accelerate, the driver of the subject vehicle 3 can also accelerate ahead of time.

Other Embodiments

Specific embodiment of the present invention has been described so far. However, the present invention is not limited to the foregoing specific embodiment but can be carried out in various other modes.

(1) The subject vehicle 3 may not have the automatic driving function. In this case, the driving control device 7 does not need to perform step S13. Alternatively, the subject vehicle 3 may perform automatic driving at any time. In this case, the driving control device 7 does not need to perform step S14.

(2) The electronic control device 1 may make a notification based on the information I but may not perform driving controls based on the information I. Alternatively, the electronic control device 1 may perform driving controls based on the information I but may not make a notification based on the information I.

(3) During manual driving, the driving control device 7 may make suggestions in accordance with the contents of the information I by using the display 19 or the speaker 21. The suggestions include a vehicle speed change, a lane change, and the like.

(4) The electronic control device 1 installed in the subject vehicle 3 may not have the function of transmitting the information I to the outside of the vehicle. In addition, the electronic control device 1 installed in the other vehicle may not have the function of acquiring the information from any other vehicles and making a notification or performing driving controls based on the information I.

(5) The change of the control mode in step S13 may be a change of the target relative speed in inter-vehicle distance maintenance control.

(6) The information transfer device 5 may transmit the information I periodically even without receipt of an information provision request.

(7) The function of one component in the foregoing embodiment may be dispersed as a plurality of components, or the functions of a plurality of components in the foregoing embodiment may be integrated into one component. In addition, some of the components in the foregoing embodiment may be omitted. Further, at least some of the components of the foregoing embodiment may be added to or replaced with other components of the foregoing embodiment. All the modes included in the technical ideas specified only by the text of the claims constitute embodiments of the present invention.

(8) The present invention can be implemented in various modes of the information transfer device and the electronic control device described above, programs for computers to serve as the information transfer device and the electronic control device, media recording the programs, information transfer methods, information transmission methods, information notification methods, and driving control methods.

The invention claimed is:

1. An information transfer device installed in a vehicle, the vehicle carrying the information transfer device being referred to as a subject vehicle, the information transfer device comprising:
    a non-transitory memory storing one or more computer programs;
    a processor executing the one or more computer programs to:
        acquire through communications with another vehicle
            (a) information indicating whether the another vehicle is being automatically driven,
            (b) information indicating functions of the another vehicle related to automatic driving,
            (c) information indicating a schedule of the another vehicle related to automatic driving, and
            (d) information indicating a reason for the schedule in (c), the reason comprising a vehicle function being performed by the another vehicle in which the schedule is a vehicle control for performing the vehicle function;
        provide the information acquired to a driver of the subject vehicle or output the information acquired to a driving control device of the subject vehicle.

2. The information transfer device according to claim 1, wherein the (b) information indicating functions of the another vehicle related to automatic driving include at least one of a function of acquiring road information and creating a speed plan in automatic driving in accordance with the road information and a function of running on a preset route.

3. The information transfer device according to claim 1, wherein the information (c) is information indicating one or more selected from a group including a schedule for switching on and off automatic driving, a schedule for changing a control mode in automatic driving, a schedule for steering in automatic driving, and a schedule for acceleration and deceleration in automatic driving.

4. An electronic control device installed in a vehicle, the vehicle carrying the electronic control device being referred to as a subject vehicle, the electronic control device comprising:
an information transfer device comprising:
a non-transitory memory storing one or more computer programs;
a processor executing the one or more computer programs to:
acquire through communications with another vehicle
(a) information indicating whether the another vehicle is being automatically driven
(b) information indicating functions of the another vehicle related to automatic driving,
(c) information indicating a schedule of the another vehicle related to automatic driving, and
(d) information indicating a reason for the schedule in (c), the reason comprising a vehicle function being performed by the another vehicle in which the schedule is a vehicle control for performing the vehicle function;
provide the information acquired to a driver of the subject vehicle or output the information acquired to a driving control device of the subject vehicle, and
the driving control device configured such that the driving control device changes a control mode of the subject vehicle based on the information acquired from the information transfer device.

5. The electronic control device according to claim 4, wherein changing of the control mode is to change a target inter-vehicle distance in an inter-vehicle distance maintenance control or a target relative speed.

6. An information transmission device installed in a vehicle, the vehicle carrying the information transmission device being referred to as a subject vehicle, the information transmission device comprising, a processor programmed to transmit (A) information indicating whether the subject vehicle is being automatically driven, (B) information indicating functions of the subject vehicle related to automatic driving, (C) information indicating a schedule of the subject vehicle related to automatic driving, and (D) information indicating a reason for the schedule in (C), the reason comprising a vehicle function being performed by another vehicle in which the schedule is a vehicle control for performing the vehicle function.

7. An electronic control system comprising:
an electronic control device installed in a first vehicle comprising:
an information transfer device comprising:
a non-transitory memory storing one or more computer programs;
a processor executing the one or more computer programs to:
acquire through communications with a second vehicle other than the first vehicle
(a) information indicating whether the second vehicle is being automatically driven,
(b) information indicating functions of the second vehicle related to automatic driving,
(c) information indicating a schedule of the second vehicle related to automatic driving, and
(d) information indicating a reason for the schedule in (c), the reason comprising a vehicle function being performed b the second vehicle in which the schedule is a vehicle control for performing the vehicle function;
provide the information acquired to a driver of the first vehicle or output the information acquired to a driving control device of the first vehicle; and
the driving control device configured such that the driving control device changes a control mode of the first vehicle based on the information acquired from the information transfer device, wherein the change of the control mode is to change a target inter-vehicle distance in an inter-vehicle distance maintenance control or a target relative speed; and
an information transmission device installed in the second vehicle comprising, a processor programmed to transmit (A) information indicating whether the second vehicle is being automatically driven, (B) information indicating functions of the second vehicle related to automatic driving, (C) information indicating a schedule of the second vehicle related to automatic driving and (D) information indicating a reason for the schedule in (C).

8. An information transfer device installed in a vehicle, the vehicle carrying the information transfer device being referred to as a subject vehicle, the information transfer device comprising:
a non-transitory memory storing one or more computer programs;
a processor executing the one or more computer programs to:
acquire through communications with another vehicle
(a) information indicating whether the another vehicle is being automatically driven,
(b) information indicating functions of the another vehicle related to automatic driving,
(c) information indicating a schedule of the another vehicle related to automatic driving, and
(d) information indicating a kind and a specification of a sensor used by the another vehicle for automatic driving; and
provide the information acquired to a driver of the subject vehicle or output the information acquired to a driving control device of the subject vehicle.

\* \* \* \* \*